US005557970A

United States Patent [19]
Abbate et al.

[11] Patent Number: 5,557,970
[45] Date of Patent: Sep. 24, 1996

[54] AUTOMATED THICKNESS MEASUREMENT SYSTEM

[75] Inventors: Agostino Abbate, Clifton Park; Julius Frankel, Rensselaer; Mark Doxbeck, Troy, all of N.Y.

[73] Assignee: The United States of America as represented by the Secretary of the Army, Washington, D.C.

[21] Appl. No.: 498,710

[22] Filed: Jul. 3, 1995

Related U.S. Application Data

[63] Continuation of Ser. No. 179,178, Jan. 10, 1994, abandoned.

[51] Int. Cl.$^6$ .................................................. G01H 5/00
[52] U.S. Cl. ........................... 73/597; 73/1 DV; 73/602; 364/508
[58] Field of Search ................................. 73/1 DV, 597, 73/592, 602, 622, 644, 1 R; 364/508, 571.01, 571.03

[56] References Cited

U.S. PATENT DOCUMENTS

| | | | |
|---|---|---|---|
| 3,994,154 | 11/1976 | Niklas | 73/597 |
| 4,346,599 | 8/1982 | McLaughlin | 73/597 |
| 4,353,257 | 10/1982 | Vrba | 73/592 |
| 4,393,711 | 7/1983 | Lapides | 73/592 |
| 4,437,332 | 3/1984 | Pittaro | 73/1 DV |
| 4,489,592 | 12/1984 | Pacanowski | 73/1 G |
| 4,597,285 | 7/1986 | Kuchar | 73/1 G |
| 4,754,645 | 7/1988 | Piche | 73/644 |

FOREIGN PATENT DOCUMENTS 303766  2/1989  European Pat. Off. ................. 73/592

*Primary Examiner*—Christine K. Oda
*Attorney, Agent, or Firm*—Saul Elbaum; Edward Goldberg; Michael C. Sachs

[57] ABSTRACT

A method for and system of measuring the thickness of a component dimension of a sample material. Sound waves are coupled for transmission along a component direction of a sample material and also through first and second reference standards to provide first and second reference thicknesses. As the sound wave signal is transmitted, the time for the sound wave signal to traverse the sample thickness and the first and second reference thicknesses is measured. The thickness of the sample is calculated by calculating the velocity of the signal from the traverse times for the first and second reference thicknesses. Preferable, the calculations are made by a computer, and may be repeated over a period of time to calculate a change of thickness as a function of time. The computer may be used to compare the instantaneous thickness of the sample with at least one parameter such as information used to control a process, a predetermined minimum or maximum thickness a predetermined rate of change with respect to a minimum or maximum time, or a predetermined uneven change in thickness between a plurality of sample thicknesses. The sample may in fact comprise a plurality of locations on a tube, and the process may control a tube being subjected to plating process or a tube that is subject to at least potential erosion of its thickness.

11 Claims, 2 Drawing Sheets

AUTOMATED THICKNESS MEASUREMENT SYSTEM

This application is a continuation, of application Ser. No. 08/179,178, filed Jan. 10, 1994, abandoned.

The invention described herein may be made, used, or licensed by or for the Government for Governmental purposes.

FIELD OF THE INVENTION

The present invention relates to a method and system for measuring the thickness of a sample, such as a tube, for example, formed as a gun barrel. More particularly, the present invention relates to a method in which sound waves are transmitted through the sample and through reference standards to determine the velocity of sound therein, from which the thickness and the rate of change of thickness with respect to time can be calculated.

BACKGROUND OF THE INVENTION

It is often desirable to measure the real time change in thickness of objects which are subjected to processes or forces which may or are intended to change those thicknesses. There are a number of situations where it would be a great advantage to be able to measure the thickness or changes in thickness as a function of time. This is particularly true in tubes such as gun barrels, hollow cylinders, pipes, or, in fact, any component direction of a material bounded by surfaces which can reflect sound waves or to which sound waves can be coupled.

It has not been possible at this time to monitor the thickness of materials over a period of time in which the information sought, such as the thickness of a tube, for example, is compared with desired results or limitations on the process in order to control the operation of the process. Limited efforts have not met with success in this area.

Prior art attempts to measure thicknesses of gun barrels and the like are described in U.S. Pat. No. 5,182,139, in the name of J. Frankel and M. Doxbeck issued on Jan. 26, 1993, based on Ser. No. 760,636 filed Sep. 16, 1991. However, it is not possible in that system to enable the user to continuously or intermittently or by remote command in any time interval measure the thickness changes under conditions in which the temperature of the specimen changes.

Accordingly it is an object of this invention to provide a method and system for measuring thicknesses of samples which are subject to change of temperature during the measurement process.

Another object is to provide a system that can be used with a computer to provide instantaneous comparison with specified parameters in order to control an ongoing process such as, for example, plating of a gun barrel.

Still another object of the invention is to provide a method in which the rate of change of thickness with respect to time can be calculated and compared at several locations on the sample.

Other Objects will appear hereinafter.

SUMMARY OF THE INVENTION

It has now been discovered that the above and other objects of the present invention may be accomplished in the following manner. Specifically, a method for and system of measuring the thickness of a component dimension of a sample material has been discovered in which sound waves are coupled for transmission along a component direction of a sample material and also through first and second reference standards to provide first and second reference thicknesses.

As the sound wave signal is transmitted, the time for the sound wave signal to traverse the sample thickness and the first and second reference thicknesses is measured. The thickness of the sample is circulated by calculating the velocity of the signal from the traverse times for the first and second reference thicknesses. Preferably, the calculations are made by a computer, and may be repeated over a period of time to calculate a change of thickness as a function of time.

Those changes of thickness which may be monitored by the present invention are those caused by plating, erosion, corrosion, vapor deposition, deplating or other reasons. These measurements can be made by the component being measured is in operation and at elevated or decreased temperature, so that no down time is required for testing.

The present invention is admirably suited for use where the measuring site is not easily accessible or because of proximity of radiation, gases, or other environments undesirable for humans, or, alternatively, where the measuring station Is unmanned and activation on command is desirable.

A major advantage of the Invention is that it may be used where temperature is changing, so that those changes are measured at the surface proximate the location of the ultrasonic transducer. For example, while the invention is useful for many processes and products, It clearly provides an important Improvement in systems where in-process plated chromium is measured while compensating for temperature changes which take place during the plating process.

In its essence, the present Invention involves a sound wave to be caused to travel, or at least have a component of travel along the direction whose dimension is to be measured or monitored as a function of time. The temperature is also measured because the velocity of sound is temperature dependent, and Is to be taken into account if high accuracies are needed or small changes in thickness are to be monitored.

A computer may be effectively used in various processes to compare the Instantaneous thickness of the sample with at least one parameter either at one point or several points on the sample. Those parameters may include information used to control a plating or deplating process, a predetermined minimum or maximum thickness of erosion in a pipe, a predetermined rate of change with respect to a minimum or maximum time for quality control, or locating uneven change in thickness between a plurality of sample thicknesses to determine uniformity of the process.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
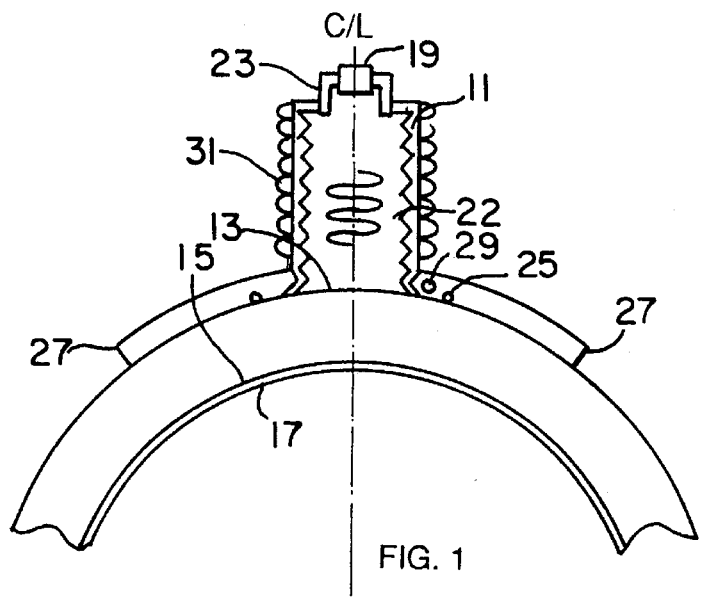
FIG. 1 is a schematic illustration of one transducer configuration for a tube employing the instant invention.

Key to the operation of the present invention is, of course, the fact that sound waves propagate in isotropic or homogeneous materials in such a way that the distance covered by the sound wave is linearly proportional to the time required. Thus if the velocity is known, and the return time of an echo is measured, the distance can readily be calculated with an accuracy or resolution, depending upon the measured qualities, that is quite useful. Since velocities can be measured within one part in one thousand, $10^3$, and time can be measured in nanoseconds, $10^{-9}$, or better, thicknesses may be measured to a resolution to $10^{-4}$ inches.

The accuracy of the present invention is even more improved because of the ability of the method and system to allow for temperature compensation of the thickness.

In the preferred embodiment, a temperature compensation calculation can be made where the accuracy needed is overwhelmed by the effect of temperature on the sound velocity in question, such as when great temperature variations are expected in plating processes and the like. The temperature dependence of the velocity can be incorporated into the system of this invention via the use of temperature compensation equations.

The time of travel (t) of a sound wave through a material is given by the simple relationship $t=L/v$, where L is the distance or path and v is the average velocity of the sound wave. The thickness is thus obtained once the velocity is known accurately and the time measured. To evaluate the velocity accurately, two samples of known thickness (made from the same material) are incorporated into the measurement.

The thickness of the two standards and the sample are identified as $l_1$, $l_2$ and $l$ respectively. Similarly, the measured time for the two standards and the sample, respectively, are $t_1$, $t_2$, and $t$. The initial value for these variables is designated with the superscript $^{(o)}$ while the generic measurement at time t is designated $^{(t)}$.

The velocity v of the sound wave is determined by measurements performed on the two standards and calculated using the equation: $v^{(t)}=2\cdot[l_2^{(t)}-l_1^{(t)}]/[t_2^{(t)}-t_1^{(t)}]$ so that the thickness of the measured sample can be written as: $l^t=2\cdot[l_2^{(t)}-l_1^{(t)}]/[t_2^{(t)}-t_1^{(t)}]\cdot t^{(t)}$ which $=\frac{1}{2}\ v^{(t)}\cdot t^{(t)}$.

The measured variation in thickness due to any physical process that has altered the thickness of the material may be affected by both electronic drift and by the difference in sound velocity due to temperature. Accordingly, the difference in length $l^{(t)}=l^{(t)}-l^{(o)}=RCIT+ED+DSVT$, where RCIT is the real change in thickness, ED is electronic drift, and DSVT is the difference in sound velocity due to temperature.

$RCIT=[l_2^{(t)}-l_1^{(t)}]/[t_2^{(t)}-t_1^{(t)}\cdot l^{(t)}]$. $ED=[l_2^{(t)}-l_1^{(t)}]/[t_2^{(t)}-t_1^{(t)}]\cdot\frac{1}{2}\ [t_2^{(t)}-t_2^{(o)}+t_1^{(t)}-t_1^{(o)}]$. Finally $DSVT=-[l_2^{(t)}-l_1^{(t)}]/[t_2^{(t)}-t_1^{(t)}]\cdot[t^{(t)}\ \beta\ [T^{(t)}-T^{(2)}]]$ where $T^{(t)}$ and $T^{(s)}$ represent the temperature of the sample and of the standards. The value of $\beta$ for gun steel, $\beta$ being the coefficient of expansion, for example, is $16.5\times10^{-5}$ per degree C.

When all these corrective factors are combined, it is possible to compute the change in length $\partial l^{(t)}$ of the thickness of the sample as the final equation becomes $\partial l^{(t)}=[l_2^{(t)}-l_1^{(t)}]/[t_2^{(t)}-t_1^{(t)}]\cdot\{[t^{(t)}-t^{(o)}]+\frac{1}{2}\cdot[t_2^{(t)}-t_2^{(o)}+t_1^{(t)}-t_1^{(o)}]-[t^{(t)}\ \beta\ [T^{(t)}-T^{(s)}]\}$. Accordingly, it is necessary to make accurate measurements and to program a computer to perform these simple functions to determine the change in length, $\partial l^{(t)}$, of the thickness of the sample with constant correction for temperature effects on the material of construction.

The sound wave may be generated by a piezoelectric, or by an electromagnetic acoustic transducer, or by a laser, depending upon the circumstances of the measurement. The arrival of the sound wave can be sensed by these devices as well. The system is operable in the pulse-echo mode using one transducer, which generates the sound wave and senses the return echo. Alternatively a two transducer configuration may be employed where one transducer generates a signal and the other transducer receives or senses the sound waves.

As shown in FIG. 1, a configuration is shown for a first embodiment where two cylindrical approximately concentric surfaces are involved, and long-term measurements are desired, such as shown in the U.S. Pat. No. 5,182,139 previously identified. A cylinder 11 is mounted on a first surface 13 along a centerline C/L which is aligned with second surface 15 and third surface 17. A focused transducer 19 directs sound waves 21 through a water-alcohol couplant 22 along centerline C/L and, of course, senses the return echo. The transducer 19 is mounted on a plastic fitting 23, which in turn is mounted on surface 13 using an o-ring 25 and saddle 27. Thermocouple 29 senses the temperature of the surface of the cylinder being measured and a water Jacket 31 maintains a constant temperature surrounding the plastic fitting 23 and therefore the couplant 22. In this embodiment, where the liquid coupling 22 is externally cooled, an effective protection against heat which would damage commercial transducers is provided. This mounting is efficient when transducers are used over again for measurements that have to be performed for the same geometry, where one cylindrical surface is accessible to the measurement and the surfaces in question are concentric.

Figure 2:
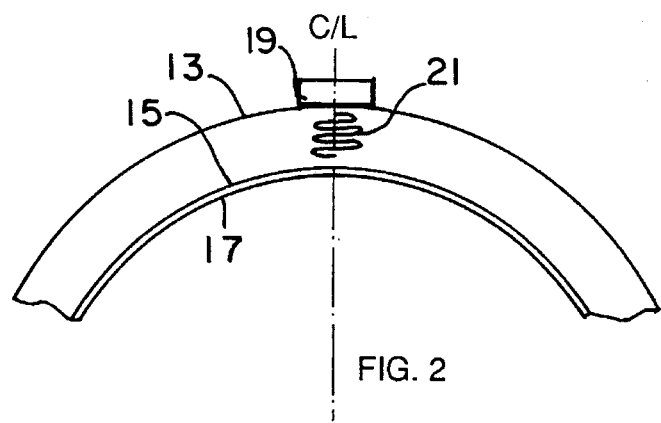
FIG. 2 is a schematic view illustrating a long term monitoring embodiment.

FIG. 2 illustrates a configuration for a situation where two cylindrical approximately concentric surfaces 13 and 15 are involved and long-term measurement is desired. Here, however, the transducer 19 is attached, such as by glue, directly to the outer surface 13 and its useful life is dedicated to the one long-term measurement. If higher temperatures are involved the transducer to specimen bond and the transducer itself have to be stable for the contemplated operating temperature. In this embodiment, stability is defined as that which produces no changes in return time of the sound wave with respect to the resolution of the measurement due to the effects of temperature on the epoxy adhesive or the components involving the bond or the transducer.

Figure 3A:
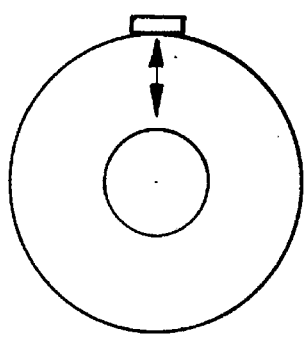
FIG. 3 is an enlarged schematic illustration of three alternate ways to mount specific transducers depending upon the geometry of the sample.
Figure 3B:
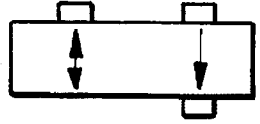
Figure 3C:
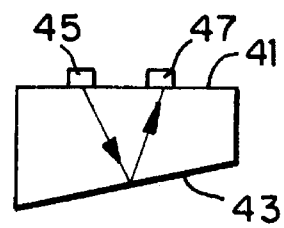

These requirements are true also for embodiments where there is a cylinder, a parallel plate specimen where one or two transducers are located, or a specimen where the two surfaces are not parallel, as illustrated respectively in FIG. 3 at a, b and c. Note that c of FIG. 3 represents a situation where two transducers are used to measure changes for two non parallel surfaces 41 and 43. The two transducers 45 and 47 are placed to optimize the return signal and the path of the sound wave has to be known so that corrections can be made between the changes in thickness and the path of the sound wave.

Figure 4:
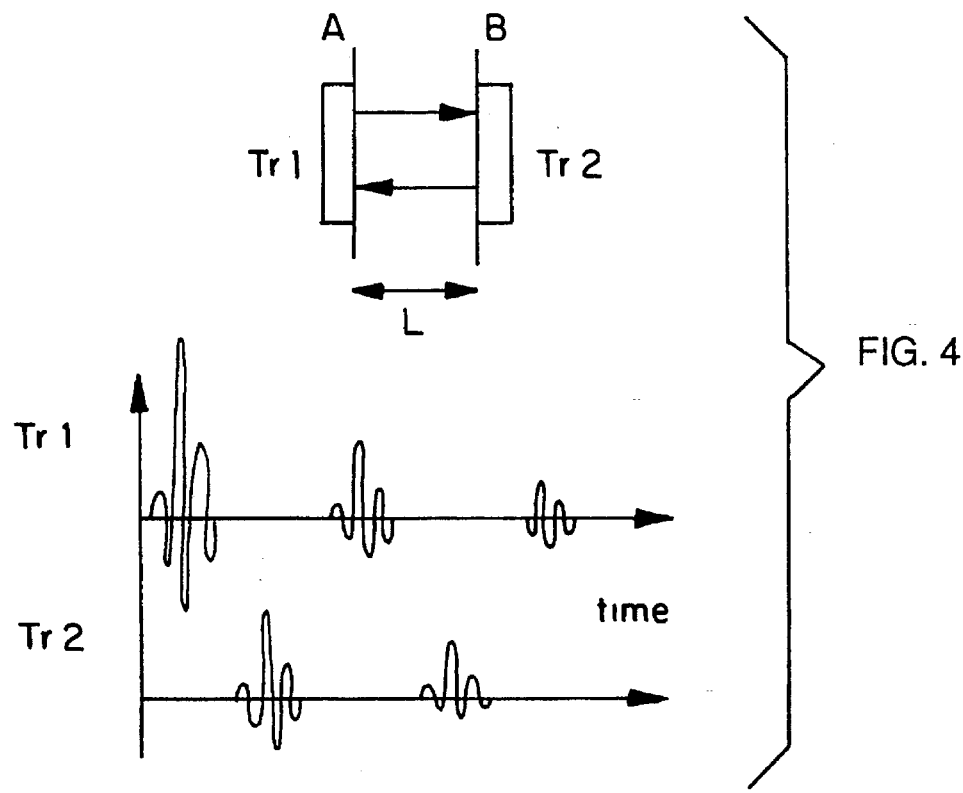
FIG. 4 illustrates the locations of the gate where data is obtained for optimum results in receiving the relevant echoes.

Shown in FIG. 4 is an illustration that the time location of the echoes produced by the transducer arrangement depends on whether one or two transducer operation is used, so that the position of the gate (where the data is obtained) is placed in the regions in the time domain with respect to trigger that starts the excitation, known as the main bang, at the location where the relevant echoes are expected.

Figure 5:
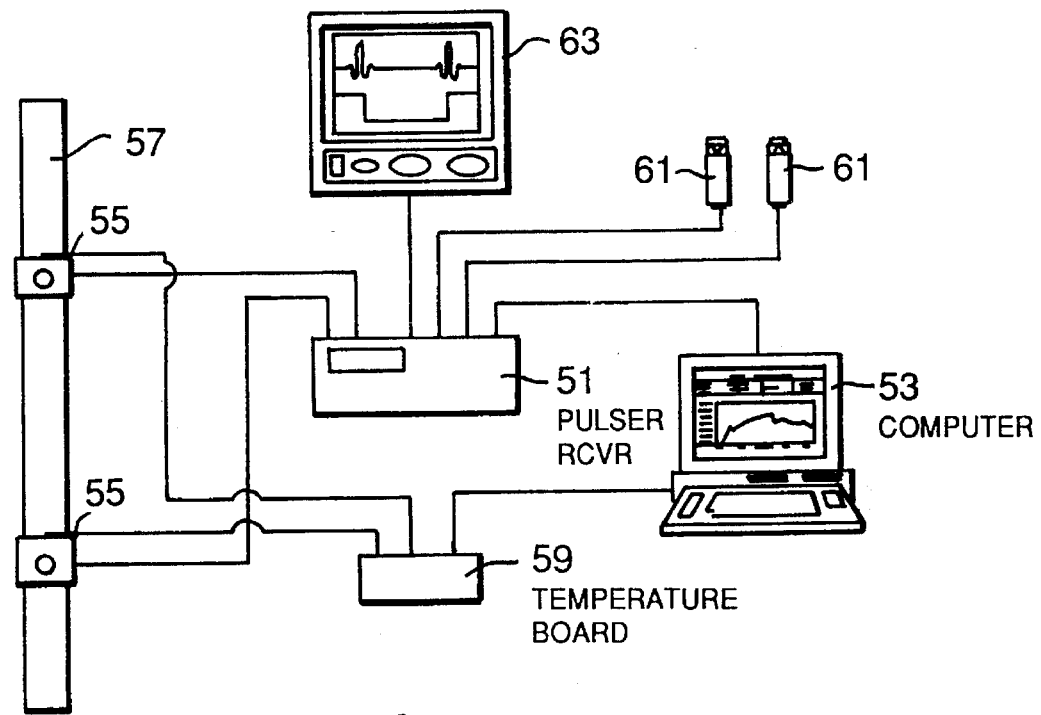
FIG. 5 is a schematic illustration of equipment employed in the system of this invention.

Turning now to FIG. 5, the system of the present invention is illustrated schematically. A commercially available ultrasonic pulser-receiver 51 and appropriate circuits that can read time intervals between echoes is employed, this unit being a Panametrics 5215-8C. This unit is capable of reading time intervals between echoes that are taken over time intervals preset by gates. Data is transmitted to a computer 53. Thermocouples 55 at the specimen 57 are read via a temperature board 59, and this data is also fed into the computer 53. This embodiment also includes two standards 61, each of which includes a disk that is fluid coupled to a transducer that allows the system to continuously read the disk thickness. In this manner, two slightly different constant and known thicknesses of material similar to the substrate specimen are continuously monitored. The method of coupling the standards 61 to the transducer is necessarily the same as in the actual measurement on the sample, and would be glued in cases like FIG. 3 and attached as in FIG. 1 if that is how the sample is coupled with its transducer.

The use of standards in this manner accomplishes continuous calibration of the system and counteracts any drift of the electronics. In applications of the invention where plating is being done with a material different from the substrate, at least having different sound velocities, since calibration takes place via the standards which are of the substrate material, an adjustment has to be made to the velocity. A multiplexer is contained in the equipment which cycles through the transducers and thermocouples, and in such a way the system will obtain and process all the readings.

An oscilloscope 63 is used for the signal display from the computer along with other data being processed. It is easily possible to display sample thickness, change in thickness with respect to time, temperatures, temperature compensated thicknesses or changes, as well as instantaneous coating thickness and rate of increase of thickness. With two samples being evaluated essentially separately, the progress of the particular process upstream or downstream can be measured, and comparative evaluations can be made at different points on the sample.

In one experiment the present invention was used to control the plating of a gun barrel. In order to act as an effective process controller for the case of plating of the barrel, the average thickness and rate of change values were calculated and displayed for each ring on the barrel. The values were compared so that tapering was evaluated. A signal, or voltage output, was provided from the computer to adjust rates of plating at the two locations as needed by comparison with the parameters selected for control. Because of the control which the computer gives, averaging can take place for any transducers and output is proportional to those positions. Further, the measurement can be activated or deactivated remotely so that an intermittent control can be exercised.

The computer monitors the output of the transducers and the thermocouples, and calculates the temperature compensated thickness and/or change in thickness as a function of time. Depending upon the number of transducers measuring the thickness, the computer will be able to execute three deterministic functions. First, it can calculate the overall thickness and/or change in thickness. Second, it can calculate the thickness and/or change in thickness for a series of transducers. Third, it can calculate the thickness and/or change in thickness for each individual transducer. This data is stored in memory along with the time for each measurement. From this information the rate of change in thickness per time interval is calculated for all three of these functions.

With the above data it is possible to produce a series of output signals via the digital output board to indicate the status of the process being used. Comparison with parameters as identified above will permit control of many process for which the invention is intended to be used.

While particular embodiments of the present invention have been Illustrated and described herein, It is not intended that these illustrations and descriptions limit the invention. Changes and modifications may be made herein without departing from the scope and spirit of the following clams.

We claim:

1. A method of measuring the change in thickness of a component dimension of a sample material to which sound waves are coupled, comprising;

providing said sample material having said component dimension to which said sound waives are coupled;

providing first and second reference standards, each of said standards including a material of predetermined thickness to provide first and second reference thicknesses respectively;

transmitting a sound wave signal over a period of time through said sample material and each of said reference standards;

repeatedly measuring the time for said sound wave signal to traverse said sample thickness and each of said first and second reference thicknesses over said period of time; and calculating the change in thickness of said sample thickness with respect to time by calculating the velocity of said signal from the measured times for said first and second reference thicknesses and the measured time for said thicknesses on a computer using the equation $\partial l^{(t)} = [l_2^{(t)} - l_1^{(t)}]/[t_2^{(t)} - t_1^{(t)}] \cdot \{[t^{(t)} - t^{(o)}] + \frac{1}{2} \cdot [t_2^{(t)} - t_2^{(o)} + t_1^{(t)} - t_1^{(o)}] - [t^{(t)}\beta [T^{(t)} - T^{(s)}]]\}$.

2. The method of claim 1, wherein said calculations are repeated over a period of time to calculate a change of thickness as a function of time.

3. The method of claim 1, which includes the additional step of measuring the temperature proximate the material and the standards and the calculation of velocity includes a correction for change in temperature from a predetermined temperature.

4. The method of claim 2, wherein said computer is used to compute and compare the instantaneous thickness of the sample material with at least one parameter selected for control with respect to time using the equation.

5. The method of claim 4, wherein the result of said comparison with said at least one parameter is information used to control a process with respect to time.

6. The method of claim 5, wherein said at least one parameter is either a predetermined minimum or maximum thickness.

7. The method of claim 5, wherein said at least one parameter is either a predetermined rate of change with respect to a minimum or maximum time.

8. The method of claim 5, wherein said at least one parameter is a predetermined uneven change in thickness between a plurality of sample thicknesses.

9. The method of claim 5, wherein said sample material is a tube being subjected to a plating process.

10. The method of claim 5, wherein said sample material is a tube subject to at least potential erosion of said tube's thickness.

11. A system of measuring the change in thickness of a component dimension of a sample material to which sound waves is coupled, comprising;

a source of said sound waves for transmission along said component direction of said material;

sample material attached to said source of sound waves to provide sound waves along a component dimension;

first and second reference standards attached to said source of sound waves, each of said standards including a material of a predetermined thickness to provide first and second reference thicknesses respectively;

means for transmitting a sound wave signal over a period of time through said sample material and each of said reference standards;

means for repeatedly measuring the time for said sound wave signal to traverse said sample material thickness and each of said first and second reference thicknesses over said period of time; and means for calculating the change in thickness of said sample thickness with respect to time by calculating the velocity of said signal from the traverse measured times for said first and second reference thicknesses and the measured time for said sample material thickness to provide a signal proportional to said sample material thickness, on a computer using the equation $\partial l^{(t)} = [l_2^{(t)} - l_1^{(t)}]/[t_2^{(t)} - t_1^{(t)}] \cdot \{[t^{(t)} - t^{(o)}] + \frac{1}{2}[t_2^{(t)} - t_2^{(o)} + t_1^{(t)} - t_1^{(o)}] - [t^{(t)}\beta [T^{(t)} - T^{(s)}]\}$.

\* \* \* \* \*